US007449418B2

(12) United States Patent
Ishikawa et al.

(10) Patent No.: US 7,449,418 B2
(45) Date of Patent: Nov. 11, 2008

(54) SURFACE MATERIAL AND ABSORBENT ARTICLE USING THE SAME

(75) Inventors: Hideyuki Ishikawa, Kagawa-ken (JP); Yuki Noda, Kagawa-ken (JP); Akihiro Kimura, Kagawa-ken (JP)

(73) Assignee: Uni-Charm Corporation, Ehime-Ken (JP)

( * ) Notice: Subject to any disclaimer, the term of this patent is extended or adjusted under 35 U.S.C. 154(b) by 0 days.

(21) Appl. No.: 11/456,706

(22) Filed: Jul. 11, 2006

(65) Prior Publication Data

US 2007/0015428 A1    Jan. 18, 2007

(30) Foreign Application Priority Data

Jul. 12, 2005    (JP)    ............................. 2005-203732

(51) Int. Cl.
*D04H 1/54*    (2006.01)
*D04H 3/14*    (2006.01)
*D04H 5/06*    (2006.01)

(52) U.S. Cl. ...................... 442/409; 442/361; 442/381; 442/411; 442/394; 442/415

(58) Field of Classification Search ................. 442/409, 442/361, 381, 411, 394, 415

See application file for complete search history.

(56) References Cited

U.S. PATENT DOCUMENTS

| | | | | |
|---|---|---|---|---|
| 4,883,707 A | * | 11/1989 | Newkirk | ...................... 428/219 |
| 6,015,764 A | * | 1/2000 | McCormack et al. | ........ 442/370 |
| 6,271,155 B1 | * | 8/2001 | Noma et al. | ................. 442/398 |
| 6,797,655 B2 | * | 9/2004 | Rudisill | ...................... 442/400 |
| 2006/0121811 A1 | * | 6/2006 | Mangold et al. | ............. 442/392 |

FOREIGN PATENT DOCUMENTS

JP    2004-166831    6/2004
WO    WO2006/031625 A2 *    3/2006

* cited by examiner

*Primary Examiner*—Norca L Torres-Velazquez
(74) *Attorney, Agent, or Firm*—Lowe Hauptman Ham & Berner, LLP

(57) ABSTRACT

A surface material for an absorbent article includes a fibrous web formed by thermally bondable component fibers bonded together under the effect of a hot blast and has a hot blast-exposed surface and a surface opposite to this hot blast-exposed surface. The fibrous web includes, in turn, a first layer lying on the side of the hot blast-exposed surface and having a buffering function to alleviate an influence of the hot blast upon the surface opposite to this hot blast-exposed surface, and a second layer lying on the side opposite to the hot blast-exposed surface.

17 Claims, 4 Drawing Sheets

SURFACE MATERIAL AND ABSORBENT ARTICLE USING THE SAME

BACKGROUND OF THE INVENTION

The present invention relates to generally surface materials, and particularly, to surface materials which are suitable for use in absorbent articles such as sanitary napkins or disposable diapers and to the absorbent articles using such surface materials.

Conventionally, nonwoven fabrics obtained through a so-called air-through process have often been used as surface materials of absorbent articles such as disposable diapers or sanitary napkins. The air-through process comprises a step of subjecting a fibrous web such as a carded web laid on an air-permeable net or a drum to hot blast so as to heat-weld component fibers at intersections thereof.

The air-through nonwoven fabrics obtained through such process are characterized by comfortably airy texture. However, on the surface of such air-through nonwoven fabrics directly exposed to hot blast (referred to hereinafter as "hot blast-exposed surface"), the component fibers are generally apt to be raised.

Taking accounting of such tendency when the air-through nonwoven fabric is used as a surface material for the absorbent article, the surface of such type of nonwoven fabric opposite to the blown surface, i.e., the surface opposed to the net or the drum (referred to hereinafter as "net-side surface") has usually been laid so as to face the article wearer's skin.

However, a fibrous layer on the net-side surface is not apt to become airy as easily as the hot blast-exposed surface is and, in many cases, remains in a state compressed in thickness direction thereof. Therefore, if the absorbent article is designed in a manner that the fibrous layer on the net-side surface is put in contact with the wearer's skin, there will be likely that at least a portion of body fluids discharged by the article wearer might stay on and/or soak through the surface material.

Recently, there is a demand for a tangibly improved texture of the absorbent article and it has already been proposed to design the absorbent article so that the hot blast-exposed surface of the air-through nonwoven fabric is opposed to the article wearer's skin (See REFERENCE: Japanese Unexamined Patent Application Publication No. 2004-166831).

In the case of the absorbent article disclosed in this REFERENCE, a diameter of each component fibers on the hot blast-exposed surface of the air-through nonwoven fabric is dimensioned as thin as in a range of 11 to 18 μm and thereby intersections of the component fibers are increased in order to alleviate the tendency that the component fibers would readily raise on the hot blast-exposed surface. Even in this case, however, it will be impossible to restrain the raising tendency to an acceptable degree because much more component fibers on the hot blast-exposed surface than those on the net-side surface are headed in the thickness direction of the nonwoven fabric.

The conventional technique according to which the absorbent article is designed so that the net-side surface of the surface material faces the wearer's skin may result in poor absorbency for body fluids discharged by the wearer for the reason as has been described above. On the other hand, the technique disclosed in REFERENCE according to which the absorbent article is designed so that the hot blast-exposed surface of the surface material faces the wearer's skin is unable to restrain the raising tendency to an acceptable degree and consequentially to achieve touch and feeling which are comfortable for the article wearer. Therefore, there is a demand for development of the air-through nonwoven fabric improved so as to solve the problems as have been described above.

SUMMARY OF THE INVENTION

In view of the problems as have been described above, it is an object of the present invention to provide a surface material and an absorbent article using the same wherein a thermally bondable fibrous layer on the side opposite to the hot blast-exposed surface is prevented from being fixed in a state compressed in the thickness direction as the surface material is exposed to hot blast and, in addition, to provide an absorbent article using such surface material.

The object set forth above is achieved, according to the present invention, an improvement in the surface material comprising fibrous web in which thermally bondable component fibers have been bonded together as these component fibers are exposed to hot blast, and having a hot blast-exposed surface and a surface opposite thereto, wherein the surface material comprises a first layer defining the hot blast-exposed surface so as to function as a buffer adapted to alleviate an influence of hot blast upon the surface opposite to the hot blast-exposed surface and a second layer defining the surface opposite to the hot blast-exposed surface.

The first layer's buffer function against hot blast herein specifically refers to the function which alleviates an influence of hot blast upon the surface opposite to the hot blast-exposed surface and thereby allows the second layer to become appropriately airy. More specifically, the surface material according to the present invention includes the first layer having such buffer function against hot blast so that an interfiber distance in the second layer on the surface opposed to the hot blast-exposed surface (i.e., the net-side surface) can be prevented from being excessively shortened (i.e., a density of the second layer is prevented from increasing). In this way, the problem that body fluids discharged by the article wearer may stay on or soak through the surface material even when the surface opposed to the hot blast-exposed surface is laid so as to face the article wearer's skin.

The first layer having the buffer function against hot blast may be formed, for example, by microporous plastic film having porosity in a range of 5 to 40%. Such microporous plastic film used as the first layer interfaces passage of hot blast and correspondingly buffers the influence of hot blast upon the second layer. If the porosity is less than 5%, an interfiber bond in the second layer would be insufficient and the component fibers in this second layer would be readily raised. If the porosity exceeds 40%, on the contrary, it would be impossible to assure the desired buffer function against hot blast and the interfiber distance in the second layer would be unacceptably shortened.

While a diameter of each micropore as well as an area of each micropore is not specified herein, the diameter is preferably in a range of 0.2 to 5.0 mm and more preferably in a range of 0.5 to 3.0 mm in order to ensure the buffer function against hot blast which is effective evenly over the whole area. The area of each micropore is preferably in a range of 0.03 to 30 mm$^2$ and more preferably in a range of 0.3 to 20 mm$^2$.

Preferred film material may be selected from various types of thermoplastic resin such as polyethylene, polypropylene, polyethyleneterephthalate, polyvinyl alcohol, polylactic acid and polybutyl succinate. In any case, a thickness of the film is preferably in a range of 15 to 60 μm. A basis weight of the film is preferably in a range of 15 to 60 g/m$^2$.

Furthermore, the microporous plastic film is preferably filled with inorganic filler such as titanium oxide, barium sulfate or calcium carbonate in order to prevent body fluids such as menstrual blood or urine from being seen through the article from the outside after passage through the film.

Moreover, the microporous plastic film used for the present invention is preferably mixed with or coated on its surface with suitable agent modifying the film to be hydrophilic in order that the hydrophilicity of the film can be improved and body fluids can smoothly pass through the micropores of the film.

The micropores may be formed optionally by any one of various processes such as embossing, perforating and tentering and also by filling the film material with said inorganic filler followed by orientation thereof. It should be noted that, when the plastic film formed with the micropores by perforation is used as the first layer, the first and second layers are placed upon each other preferably with edges of the respective micropores headed away from the second layer.

Generally, the second layer is preferably formed by fibers adapted to be thermally bonded together at a temperature as low as the micropored plastic film defining the first layer is not molten at this temperature. It should be understood that the second layer may be formed by either fibers of simplex structure or composite fibers of side-by-side structure, core-sheath structure, etc. In the latter case, the second layer is preferably formed by the composite fibers made primarily of high density polyethylene, polypropylene, etc. The first and second layers may be bonded together in such a manner that the component fibers of the second layer molten under the effect of hot blast may be bonded to the microporous plastic film, or may be partially bonded together by embossing or by means of appropriate adhesive such as hot melt adhesive.

When both the first layer and the second layer are made of fibrous material, the first layer can be provided with the desired buffer function against hot blast by meeting requirements as will be described below.

The first and second layers comprise one or more types of thermoplastic resin fibers and a melting point of thermoplastic resin contained in the second layer and having the highest melting point is higher than a melting point of thermoplastic resin contained in the first layer and having the highest melting point by 50° C. or more; the first layer comprises first and second fibers made of one or more types of thermoplastic resin while the second layer comprises third and fourth fibers made of one or more types of thermoplastic resin, a melting point of thermoplastic resin contained in the first fibers and having the highest melting point is higher than a melting point of thermoplastic resin contained in the second fibers and having the highest melting point by 50° C. or more, a differential melting point between a melting point of thermoplastic resin contained in the third fibers and a melting point of thermoplastic resin contained in the fourth fibers and having the highest melting point is less than 50° C. and a content of the second fibers with respect to all fibers contained in the first layer is 5 mass % or higher; and the first layer comprises first and second fibers made of one or more types of thermoplastic resin while the second layer comprises third and fourth fibers made of one or more types of thermoplastic resin, a melting point of thermoplastic resin contained in the first fibers and having the highest melting point is higher than a melting point of thermoplastic resin contained in the second fibers by 50° C. or more and having the highest melting point, a melting point of thermoplastic resin contained in the third fibers and having the highest melting point is higher than a melting point of thermoplastic resin contained in the fourth fibers by 50° C. or more, and a content of the second fibers with respect to all fibers contained in the first layer is higher than a content of the fourth fibers with respect to all fibers contained in the second layer by 5 mass % or more.

In the fibrous web formed by the fibers meeting the requirements as have been described above, thermal strain is generated in the component fibers of the first layer as this first layer is exposed to hot blast and consequentially the first layer buffers an influence of hot blast upon the second layer. At the same time, heat resistance is higher in the second layer than in the first layer and therefore it is not likely that the first layer might get soft and collapse more significantly than the first layer under the effect of hot blast.

While not specified so long as the requirements as have been described above are met, the type of thermoplastic resin may be preferably selected from polyolefin-based resin, polyester-based resin, polyamide-based resin and polyurethane-based resin.

Polyolefin-based resin may include low density polyethylene, high density polyethylene, polypropylene and modified polypropylene. Polyester-based resin may include polyethyleneterephthalate and copolymer polyester. Polyamide-based resin may include nylon.

While the above-described fibers may be either the fibers of simplex structure or composite fibers, more particularly composite fibers of core-sheath structure is preferable. When the composite fibers of core-sheath structure is used as the above-described fibers, a melting point of the resin defining the core is preferably higher than a melting point of the resin defining the sheath in order to ensure that the resin of the sheath is reliably fused together. Core-sheath ratio is preferably in a range of 70:30 to 30:70 and more preferably in a range of 60:40 to 40:60. It is possible also to use the core-sheath composite fibers in which the core is eccentric.

While the above-described fibers may be either hollow or solid, the second layer preferably comprises a combination of the solid fibers and the hollow fibers. Cross-section of the above-described fibers may be selected from circular shape, flat shape, Y-shape and C-shape.

Alternatively, either stereoscopically crimped fibers which is explicitly crimped or potentially crimped as it is heated, or split fibers adapted to split under a physical load such as water stream or embossing may be also used as the above-described fibers.

According to one preferred embodiment, in the first layer, the first fibers in the first layer is composite fibers made of polyolefin-based resin and polyester-based resin while the second fibers is composite fibers made of polyolefin-based resin. According to a particularly preferred embodiment, the first fibers are composite fibers made of polyethylene and polyethyleneterephthalate while the second fibers is composite fibers made of polyethylene and polypropylene.

As one embodiment of the invention, both the third and fourth fibers in the second layer may be composite fibers made of polyolefin-based resin and polyester-base resin. Alternatively, the third fibers may be composite fibers made of polyolefin-based resin and polyester-based resin while the fourth fibers may be composite fibers made of polyolefin-based resin. In the former case in which each of the third and fourth fibers is composite fibers made of polyolefin-based resin and polyester-based resin, this composite fibers is preferably made of polyethylene and polyethyleneterephthalate. In the latter case in which the third fibers is composite fibers made of polyolefin-based resin and the fourth fibers is composite fibers made of polyolefin-based resin, the third fibers is preferably made of polyethylene and polyethyleneterephthalate while the fourth fibers is preferably made of polyethylene and polypropylene.

Particularly in the first layer, on one hand, the first fibers is composite fibers of core-sheath structure consisting of the core formed by polyethyleneterephthalate and the sheath formed by polyethylene while the second fibers is composite fibers of core-sheath structure consisting of the core formed by polypropylene and the sheath formed by polyethylene wherein a mixing ratio of these first and second fibers is preferably in a range of 95:5 to 0:100, more preferably in a range of 90:10 to 20:80 and most preferably in a range of 85:15 to 75:25. In the second layer, on the other hand, each of the third and fourth fibers is composite fibers consisting of the core formed by polyethyleneterephthalate and the sheath formed by polyethylene or the third fibers is composite fibers consisting of the core formed by polyethyleneterephthalate and the sheath formed by polyethylene while the forth fibers is composite fibers of core-sheath structure consisting of the core formed by polypropylene and the sheath formed by polyethylene wherein a mixing ratio of these third and fourth fibers is preferably in a range of 100:0 to 20:80, more preferably in a range of 100:0 to 60:40 and most preferably in a range of 100:0 to 80:20.

In this way, both the first layer and the second layer reliably become airy so that the component fibers may be sufficiently spaced one from another to obtain the surface material being outstanding in air-permeability and drape characteristics.

Preferred examples of resin constituting the first to fourth fibers and melting points of the respective examples are shown in TABLE 1. These examples shown in TABLE 1 may be selectively used. Melting points of the respective examples can be measured by reading peak values of calorific capacity from a thermogram obtained by thermal analysis using a differential scanning calorimeter (DSC).

TABLE 1

| Resin | MP (° C.) |
| --- | --- |
| Low density polyethylene (LDPE) | 80-125 |
| Linear low density polyethylene (LLDPE) | 90-135 |
| High density polyethylene (HDPE) | 110-145 |
| Polypropylene (PP) | 155-175 |
| Copolymer polypropylene | 110-135 |
| Copolymer polyester | 100-120 |
| Polyethyleneterephthalate (PET) | 245-265 |
| Nylon | 210-225 |
| Polyurethane | 150-230 |

Also for the surface material in which both the first layer and the second layer are formed by fibrous material, the first through fourth fibers are preferably filled with inorganic filler such as titanium oxide, barium sulfate or calcium carbonate to assure a concealing effect. A content of such inorganic filler in the first through fourth fibers is preferably in a range of 0.2 to 50 mass %. For these first through fourth fibers each of which is composite fibers of core-sheath type, one or both of these core and sheath may be added with the inorganic filler. However, taking account of possibility that the inorganic filler might fall off from the fibers during the process for making the fibrous web, it is preferred to add only the core with the inorganic filler. In this case, a content of the inorganic is preferably in a range of 0.2 to 6 mass % with respect to the resin destined to form the core.

In view of the fact that the fibers made of thermoplastic resin is hydrophobic as has previously been described, at least one of the first through fourth fibers is preferably mixed with suitable agent modifying it to become hydrophilic or coated with such modifying agent to obtain the surface material which has a sufficiently high liquid-permeability to alleviate undesirable phenomenon of wet-back. In this case, the desired effect can be further reliably obtained by making such fibers treatment in a manner that the first layer facing the article wearer's skin becomes more hydrophilic than the second layer. As the agent modifying the fibers to become hydrophilic, for example, surface active agent or hydrophilic high-molecular compounds may be used. While the surface active agent to be used may be selected from those of well known art such as nonionic surface active agent, anionic surface active agent, cationic surface active agent and amphoteric surface active agent, the nonionic surface active agent and the anionic surface active agent are more preferable. These surface active agents may be used independently or in a combination of two or more thereof. The hydrophilic high-molecular compound to be used may be selected from polyvinyl alcohol, methyl cellulose, carboxylmethylcellulose, hydroxymethylcellulose, polyvinyl pyrrolidone, polystyrene sulfonic acid, polyalkylpolyamine salt and alkali metal salt of polyethylene oxide. These hydrophilic high-molecular compounds may be used independently or in a combination of two or more thereof. Preferably, one or more of the hydrophilic high-molecular compounds are used in combination with one or more of the above-described surface active agents. Depending on desired hydrophilicity of the first through fourth fibers, it is possible also to treat the fibers with water repellent agent. As the water repellent agent, for example, silicone oligomer or fluorine oligomer may be used. As the typical silicone oligomer, polydimethyl silicone of chain structure is often used and polymethylphenyl silicone or polyfluorosilicone having methyl-groups partially substituted with phenyl-group or trifluoropropyl-group, respectively, may be also used. As the fluorine oligomer, polymeric acrylic ester of alcohol including perfluoroalkyl-group or phosphate ester may be used. These oligomers may be used independently or in a combination of two or more thereof.

In the first layer, mixing ratio between the fibers modified to be hydrophilic and water-repellent treated fibers is preferably in a range of 100:0 to 60:40 and, in the second layer, mixing ratio between the fibers modified to be hydrophilic and water-repellent treated fibers is preferably in a range of 0:100 to 70:30.

Both the first layer and the second layer may contain, in addition to the first through fourth fibers as have been described above, hydrophilic cellulosic fibers such as pulp, chemical pulp, rayon, acetate and natural cotton. It should be noted that a content of such cellulosic fibers with respect to the surface material as a whole is preferably up to 0.1 to 5 mass % and such cellulosic fibers should be contained preferably only in the first layer.

The surface material comprising the first layer and the second layer has, as a whole, a basis weight preferably in a range of 14 to 80 g/m$^2$ and more preferably in a range of 20 to 45 g/m$^2$. If the basis weight of the surface material is less than 14 g/m$^2$, the wet-back phenomenon would readily occur and, if the basis weight exceeds 80 g/m$^2$, a spot absorbency would decrease. The first layer has a basis weight preferably in a range of 5 to 40 g/m$^2$ and more preferably in a range of 8 to 30 g/m$^2$. The first layer having such basis weight has a density preferably in a range of 0.03 to 0.20 g/cm$^3$ and more preferably in a range of 0.05 to 0.15 g/cm$^3$. The second layer has a basis weight preferably in a range of 5 to 40 g/m$^2$ and more preferably in a range of 10 to 30 g/m$^2$. The second layer having such basis weight has a density preferably in a range of 0.01 to 0.15 g/cm$^3$ and more preferably in a range of 0.02 to 0.10 g/cm$^3$. Setting of the basis weights and the densities to the ranges as have been indicated above facilitates the first layer to function as buffer against hot blast, on one hand, and effectively alleviates the wet-back phenomenon possibly occurring in the first layer, on the other hand, and assures an appropriate strength of the second layer to ensure that body fluids smoothly move from the second layer to the first layer.

The surface material comprising the first layer and the second layer has, as a whole, a thickness preferably in a range of 0.3 to 4.0 mm and more preferably in a range of 0.5 to 2.0 mm as measured under a pressure of 3 g f/cm$^2$. The surface material having such range of thickness is able to maintain an appropriate flexibility. A thickness ratio between the first layer and the second layer is preferably in a range of 10:90 to 70:30 as measured under no pressure. Setting of the thickness and the thickness ratio to the ranges as have been indicated above allows body fluids to move rapidly from the second layer to the first layer.

To obtain improved air-permeability and touch, the first through fourth fibers have fineness preferably in a range of 0.1 to 6.6 dtex and more preferably in a range of 1.0 to 4.4 dtex.

To ensure that the component fibers are reliably heat-bonded together and are appropriately spaced one from another, a fibers length of the component fibers forming the first layer and the second layer may be selected upon a particular process for making the fibrous web. When the fibers is carded to open it, a fibers length is preferably in a range of 20 to 100 mm and more preferably in a range of 38 to 64 mm in order to obtain a texture formation as even as possible. When the fibers is air laid to open it, a fibers length is preferably in a range of 1 to 30 mm and more preferably in a range of 2 to 10 mm in order to obtain a texture formation as even as possible.

The first layer as well as the second layer may be fibrous web obtained by any one of the air-through process, the point bond process, the air laid process, dry spun lace process, the chemical bond process, etc. or a combination thereof. In an example of such composite process comprising two or more processes, fibrous web is accumulated on the air-permeable net as the second layer after having passed through the card and then ultrafine fibers are melt-blown onto the second layer so as to be accumulated thereon as the first layer. Alternatively, fibrous web may be accumulated on the air-permeable net as the second layer after having passed through the card and then short fibers each having a fibers length in a range of 1 to 30 mm may air laid thereon as the first layer. In this way, the first layer is obtained in the form of fibers assembly in which an interfiber distance is sufficiently small to obstruct passage of hot blast therethrough and thereby to restrain an interfiber distance of the second layer to an appropriate range. In further another example, fibrous web may be accumulated on the air-permeable net as the second layer after having passed through the card and then fibrous web may be formed on the second layer form the first layer by the point bond process, spun lace process or spun bond process. Among these processes, the air-through process is most preferable. The air-through process provides comfortable airy texture, sufficiently high liquid-permeability to alleviate undesirable wetback phenomenon and thereby the surface material of comfortable touch.

Preferred process for making the surface material according to the present invention will be described with respect to the air through process in which the first fibers are composite fibers of polyethyleneterephthalate/polyethylene core-sheath structure, the second fibers are composite fibers of polypropylene/polyethylene core-sheath structure, and both the third and fourth fibers are composite fibers of polyethyleneterephthalate/polyethylene core-sheath structure.

<Step of Stacking>

The fibrous assembly comprising the first fibers and the second fibers is opened by a first card to obtain carded web defining the first layer. The fibrous assembly comprising the third and the fourth fibers is opened by a second card to obtain carded web defining the second layer. The carded web is stacked on the air-permeable conveyor net made of wire mesh and then the carded web defining the first layer is stacked on the air-permeable net.

<Oven Step>

During conveyance of the web, hot blast at a predetermined temperature is blown out from a blower provided above the air-permeable net. Below the air-permeable net, a suction mechanism is provided to suck hot blast blown out from the blower.

A velocity of hot blast is preferably in a range of 0.2 to 2.0 m/sec and more preferably in a range of 0.5 to 1.0 m/sec. If the velocity of hot blast exceeds 2.0 m/sec, pressure of hot blast excessively compress the fibrous web as a whole against the net and prevent the fibrous web from becoming airy. If the velocity of hot blast is less than 0.2 m/sec, on the contrary, it will be difficult hot blast to exert evenly on the fibrous web over the entire area. A temperature of hot blast is preferably in a range of a melting point of the sheath resin in the composite fibers to be used minus 10° C. to this melting point plus 40° C. If the sheath resin is polyethylene, the optimal temperature of hot blast is in a range of 110 to 150° C. If the temperature of hot blast is less than the above-indicated range, the component fibers will be insufficiently bonded together resulting in an apprehension that the component fibers may be raised and/or the component fibers may partially fall off from the assembly. If the temperature of hot blast is exceeds the above-identified range, on the contrary, the thermal strain of the fibers will notably occur and the interfiber distance will be correspondingly reduced resulting in a compressed state of the fibrous web as a whole. A velocity at which the fibrous web is conveyed under hot blast is most preferably in a range of 60 to 200 m/min from the viewpoint of productivity as well as evenness of texture formation. A time for which the fibrous web stays within the oven is approximately 3 to 10 sec.

<Optional Steps>

One or more of the steps as will be described below may be optionally incorporated in the process.

Step of line tension: Before stacked on the second layer, a line tension in the direction of conveyance may be exerted upon the carded web defining the first layer. Such step of line tension causes the interfiber distance of the component fibers in the first layer to be reduced and facilitates the first layer to function as the buffer against hot blast. The preferred interfiber distance of the component fibers in the first layer is preferably in a range of 5 to 200 μm and more preferably in a range of 20 to 100 μm to ensure that the first layer effectively functions as the buffer against hot blast.

Step of cooing: The fibrous web may be cooled immediately after the oven step. For this step, the cooling system usually used for this purpose, for example, the system conveying the fibrous web along a chilling drum within which coolant water circulates or the system to blow out cold blast against the fibrous web may be used. Such step of cooling prevents the fibrous web from becoming narrow and/or collapsing even when a line tension is exerted on the fibrous web because, after the fibrous web has been subjected to the step of cooling, the fibers orientation is not easily changed and an appropriate interfiber distance is maintained.

Step of smoothing treatment: If the first layer and the second layer of the fibrous web obtained after the oven step have respective surfaces which are not smooth, the nonwoven fabric may guided along a heated roll.

When the fibrous web obtained as has been described above is used as the surface material for the absorbent article, an absorbent core is interposed between such fibrous web and the liquid-impervious sheet material. Such absorbent article is preferably designed so that the surface opposite to the hot blast-exposed surface, i.e., the second layer faces the article wearer's skin. It is possible to interpose a cushion sheet between the surface material and the absorbent core. The surface material may be embossed in order to form the surface material with the micropores and irregularities. In this case, it is also possible to emboss the surface material together with the cushion sheet.

The surface material according to the present invention may be used for various types of the absorbent article such as sanitary napkin and disposable diaper.

The present invention can provide the surface material in which the thermally bondable fibrous layer opposite to the hot blast-exposed surface is well protected from being put in a compressed state in the thickness direction thereof as this surface material is exposed to hot blast.

Various advantages are provided by the absorbent article using this surface material in a manner that the surface thereof opposite to the hot blast-exposed surface is adapted to face the article wearer's skin. Specifically, there is substantially no anxiety that body fluids discharged by the article wearer might stay on and/or soak through the surface material and the article wearer might suffer from stuffiness, itch or the other skin disorders.

DETAILED DESCRIPTION OF THE PREFERRED EMBODIMENTS

The present invention will be exemplarily described more in more details. It should be noted here that the present invention is not limited to these examples mentioned below.

Example 1

Core-sheath type polyethyleneterephthalate/polyethylene composite fibers each having a fineness of 2.6 dtex were coated with a hydrophilic agent and thereby fibers A was obtained. Similarly, core-sheath type polypropylene/polyethylene composite fibers having a fineness of 3.3 dtex were coated with the hydrophilic agent and thereby fibers B were obtained. The fibers A and the fibers B were mixed together at a mass ratio of 70:30. In both the fibers A and the fibers B, a core/sheath mass ratio was 50:50. A fibrous assembly obtained by mixing the fibers A and the fibers B was opened by the card at a rate of 20 m/min and thereby a carded web defining the first layer was obtained. The carded web obtained in this manner had a basis weight of 25 g/m².

Aside from this, core-sheath (macaroni) type polyethyleneterephthalate/polyethylene composite fibers having a fineness of 2.6 dtex was coated with a hydrophilic agent and thereby fibers C were obtained. Core-sheath type polyethyleneterephthalate/polyethylene composite fibers having a fineness of 2.2 dtex was coated with a water repellent agent and thereby fibers D were obtained. The fibers C and the fibers D were mixed together at a mass ratio of 50:50. In both the fibers C and the fibers D, a core/sheath mass ratio was 50:50. A fibrous assembly obtained by mixing the fibers C and the fibers D was opened by the card at a rate of 20 m/min and thereby a carded web defining the second layer was obtained. The carded web obtained in this manner had a basis weight of 10 g/m².

The carded webs defining the first layer and the second layer, respectively, were subjected to line tension.

The carded web defining the second layer was laid on a air-permeable net comprising a 20-mesh wire mesh and then the carded web defining the first layer was stacked thereon.

Figure 1:
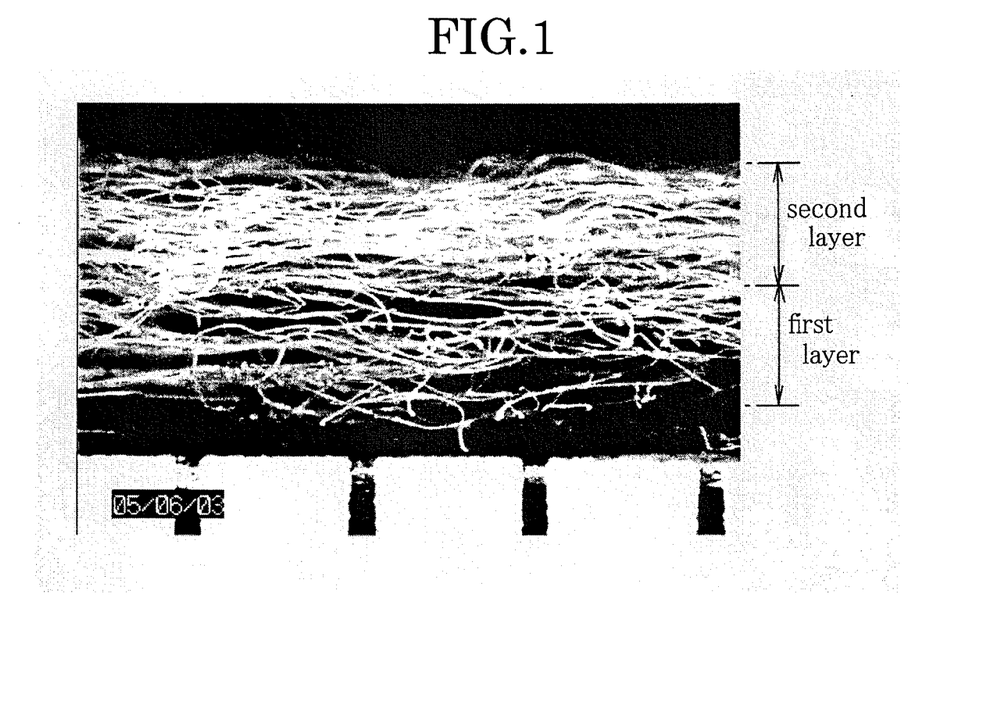
FIG. 1 is a microscopic cross-sectional photo of the surface material according to Example 1 (×120)

Hot blast at a temperature of 139° C. and a velocity of 0.6 m/sec was exerted on the fibrous assembly from the side of the first layer for approximately 5 sec while the air-permeable net is running at a velocity of 80 m/min. Consequently, intersections of the component in the web were thermally bonded together and the surface material made of the air-through nonwoven fabric was obtained. FIG. 1 is a microscopic cross-sectional photo of this surface material.

Example 2

The same fibers A and fibers B as used in EXAMPLE 1 were used and the carded web defining the first layer were obtained substantially in the same manner as in EXAMPLE 1 except that the these fibers A and B were mixed together at a mixing ratio of 60:40. The carded web had a basis weight of 20 g/m².

Similarly, the same fibers C and fibers D as used in EXAMPLE 1 were used and the carded web defining the second layer substantially in the same manner as in EXAMPLE 1 except that the carded web had a basis weight of 15 g/m².

Figure 2:
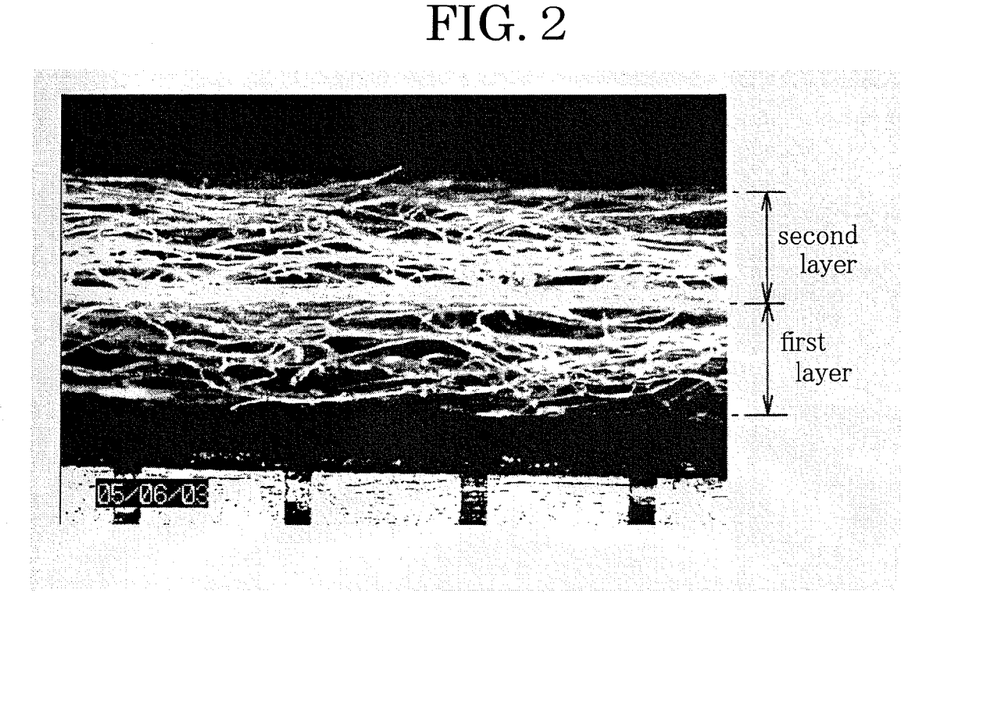
FIG. 2 is a microscopic cross-sectional photo of the surface material according to Example 2 (×120)

Subsequent steps were performed in the same conditions as in EXAMPLE 1 to obtain the surface material made of the air-through nonwoven fabric. FIG. 2 is a microscopic cross-sectional photo of this surface material.

Example 3

The same fibers A and fibers B as used in EXAMPLE 1 were used and the carded web defining the first layer were obtained substantially in the same manner as in EXAMPLE 1 except that the these fibers A and B were mixed together at a mixing ratio of 54:46. The carded web had a basis weight of 17.5 g/m².

Similarly, the same fibers C and fibers D as used in EXAMPLE 1 were used and the carded web defining the second layer substantially in the same manner as in EXAMPLE 1 except that the carded web had a basis weight of 17.5 g/m².

Figure 3:
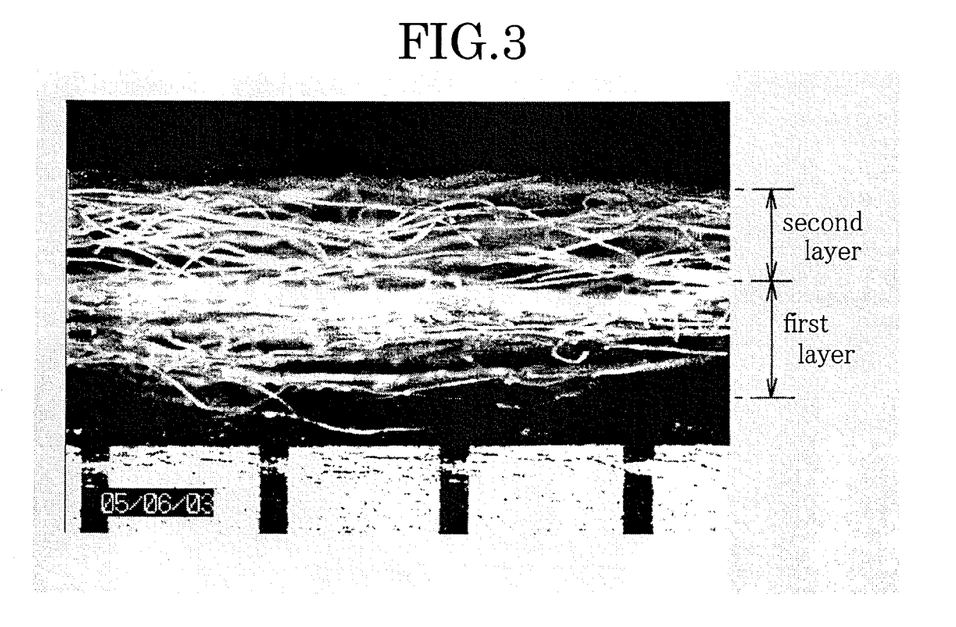
FIG. 3 is a microscopic cross-sectional photo of the surface material according to Example 3 (×120)

Subsequent steps were performed in the same conditions as in EXAMPLE 1 to obtained the surface material made of the air-through nonwoven fabric. FIG. 3 is a microscopic cross-sectional photo of this surface material.

Example 4

The same fibers A and fibers B as used in EXAMPLE 1 were used and the carded web defining the first layer were obtained substantially in the same manner as in EXAMPLE 1 except that the these fibers A and B were mixed together at a mixing ratio of 20:80. The carded web had a basis weight of 10 g/m$^2$.

Similarly, the same fibers C and fibers D as were used in EXAMPLE 1 were used and the carded web defining the second layer substantially in the same manner as in EXAMPLE 1 except that the carded web had a basis weight of 25 g/m$^2$.

Figure 4:
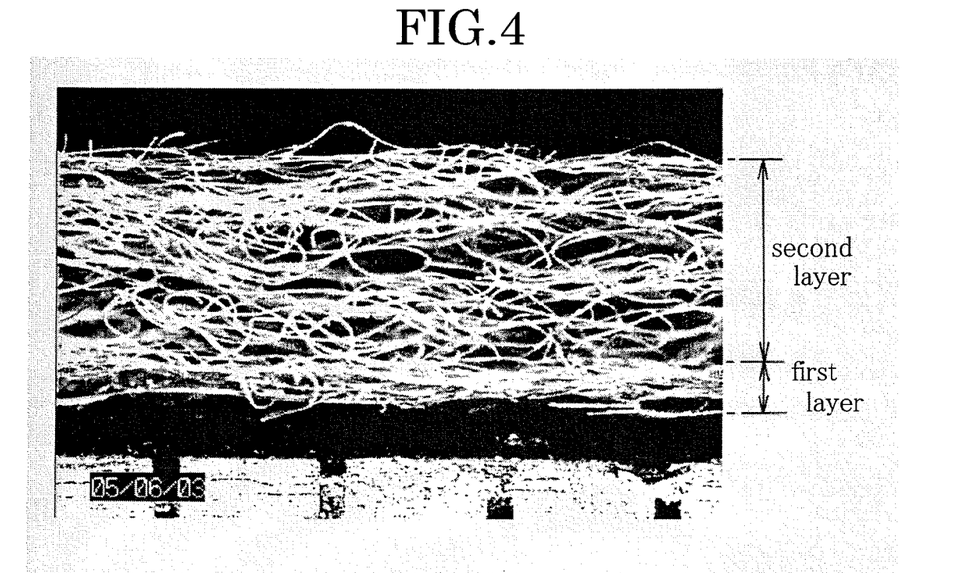
FIG. 4 is a microscopic cross-sectional photo of the surface material according to Example 4 (×120)

Subsequent steps were performed in the same conditions as in EXAMPLE 1 to obtained the surface material made of the air-through nonwoven fabric. FIG. 4 is a microscopic cross-sectional photo of this surface material.

Comparative Example 1

The same fibers C and fibers D as used in EXAMPLE 1 were mixed together at a mass ratio of 80:20. The fibrous assembly obtained by mixing the fibers C and D were opened by the card at a rate of 20 m/min and thereby the carded web was obtained. The basis weight was 35 g/m$^2$. Then, this carded web was subjected to a line tension and laid on the air-permeable net comprising the 20-mesh wire mesh.

Figure 5:
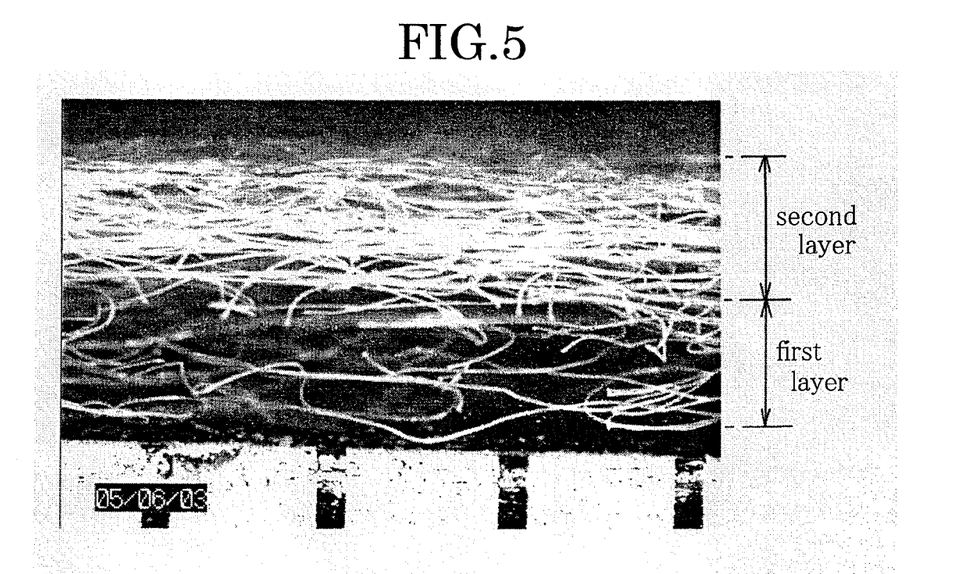
FIG. 5 is a microscopic cross-sectional photo of the surface material according to Comparative Example 1 (×120)

Hot blast at a temperature of 139° C. and a velocity of 0.6 m/sec was exerted on the fibrous assembly from one side of the first layer for approximately 5 sec while the air-permeable net was running at a velocity of 80 m/min. Consequently, intersections of the component in the web were thermally bonded together and the surface material comprising the air-through nonwoven fabric was obtained. FIG. 5 is a microscopic cross-sectional photo of this surface material.

Constituents as well as fibers structures of fibers A through D defining the respective layers in the surface materials of EXAMPLES 1 through 4 and COMPARATIVE EXAMPLE 1 are set forth in TABLE 2.

TABLE 2

| Ex. 1 | 1st layer | Fibers A: PET/PE core-sheath type; fineness of 2.2 dtex; coated with agent to modify it hydrophilic Fibers B: PP/PE core-sheath type; fineness of 3.3 dtex; coated with agent to modify it hydrophilic Basis weight ratio: A:B = 70:30; basis weight: 25 g/m$^2$ |
|---|---|---|
| | 2nd layer | Fibers C: PET/PE core-sheath macaroni type; fineness of 2.6 dtex; coated with agent to modify it hydrophilic Fibers D: PET/PE core-sheath type; fineness of 2.2 dtex, coated with repellent Basis weight ratio: C:D = 50:50; basis weight: 10 g/m$^2$ |
| Ex. 2 | 1st layer | Fibers A: PET/PE core-sheath type; fineness of 2.2 dtex; coated with agent to modify it hydrophilic Fibers B: PP/PE core-sheath type; fineness of 3.3 dtex; coated with agent to modify it hydrophilic Basis weight ratio: A:B = 60:40; basis weight: 20 g/m$^2$ |
| | 2nd layer | Fibers C: PET/PE core-sheath macaroni type; fineness of 2.6 dtex; coated with agent to modify it hydrophilic Fibers D: PET/PE core-sheath type; fineness of 2.2 dtex; coated with repellent Basis weight ratio: C:D = 50:50; basis weight: 15 g/m$^2$ |
| Ex. 3 | 1st layer | Fibers A: PET/PE core-sheath macaroni type; fineness of 2.2 dtex; coated with agent to modify it hydrophilic Fibers B: PP/PE core-sheath type; fineness of 3.3 dtex; coated with agent to modify it hydrophilic Basis weight ratio: A:B = 54:46; basis weight: 17.5 g/m$^2$ |
| | 2nd layer | Fibers C: PET/PE core-sheath macaroni type; fineness of 2.6 dtex; coated with agent to modify it hydrophilic Fibers D: PET/PE core-sheath type; fineness of 2.2 dtex; coated with repellent Basis weight ratio: C:D = 50:50; basis weight: 17.5 g/m$^2$ |
| Ex. 4 | 1st layer | Fibers A: PET/PE core-sheath type; fineness of 2.2 dtex; coated with agent to modify it hydrophilic Fibers B: PP/PE core-sheath type; fineness of 3.3 dtex; coated with agent to modify it hydrophilic Basis weight ratio: A:B = 20:80; basis weight: 25 g/m$^2$ |
| | 2nd layer | Fibers C: PET/PE core-sheath macaroni type; fineness of 2.6 dtex; coated with agent to modify it hydrophilic Fibers D: PET/PE core-sheath type; fineness of 2.2 dtex; coated with repellent Basis weight ratio: C:D = 50:50; basis weight: 10 g/m$^2$ |
| Comparative ex. 1 | | Fibers C: PET/PE core-sheath macaroni type; fineness of 2.6 dtex; coated with agent to modify it hydrophilic Fibers D: PET/PE core-sheath type; fineness of 2.2 dtex; coated with repellent Basis weight ratio: C:D = 80:20; basis weight: 35 g/m$^2$ |

All ratios set forth in EXAMPLE 2 are mass ratios. In any of the fibers A through D, the mass ratio between the core and the sheath is core:sheath=50:50.

Example 5

The same fibers A, fibers B and fibers D as used in EXAMPLE 1 and were used and the carded web defining the first layer were obtained substantially in the same manner as in EXAMPLE 1 except that the these fibers A, B and D were mixed together at a mixing ratio of 75:5:20. The carded web had a basis weight of 10 g/m$^2$.

The same fibers C and fibers D as used in EXAMPLE 1 were used and the carded web defining the second layer was obtained substantially in the same manner as in EXAMPLE 1 except that these fibers C and D were mixed together at a mixing ratio of 80:20. The carded web had a basis weight of 25 g/m$^2$.

Without exerting any line tension on the first layer and the second layer, the carded web defining the second layer was stacked on the air-permeable net comprising 20-mesh wire mesh and then the carded web defining the first layer was stacked thereon.

Figure 6:
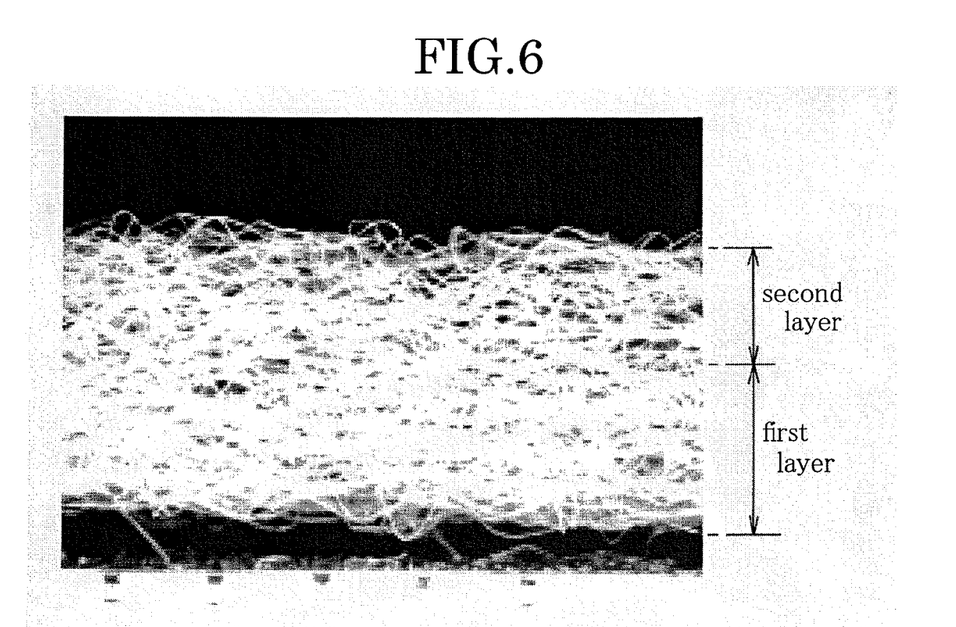
FIG. 6 is a microscopic cross-sectional photo of the surface material according to Example 5 (×90)

Hot blast at a temperature of 131° C. and an air flow of 20 Hz was exerted on the fibrous assembly from the side of the first layer for approximately 30 sec while the air-permeable net was running at a velocity of 3 m/min. Consequently, intersections of the component in the web were thermally bonded together and the surface material comprising the air-through nonwoven fabric was obtained. FIG. 6 is a microscopic cross-sectional photo of this surface material.

Example 6

As the component fibers of the first layer, the same fibers B and fibers D as used in EXAMPLE 1 and the carded web defining the first layer was obtained substantially under the same conditions as in EXAMPLE 1 except that these fibers were mixed together at a mass ratio of 80:20. The first layer had a basis weight of 10 g/m$^2$.

As the component fibers of the second layer, the same fibers C and fibers D as used in EXAMPLE 1 and the carded web defining the second layer was obtained substantially under the same conditions as in EXAMPLE 1 except that these fibers were mixed together at a mass ratio of 80:20. The second layer had a basis weight of 25 g/m$^2$.

Without exerting any line tension on the first layer and the second layer, the carded web defining the second layer was stacked on the air-permeable net comprising 20-mesh wire mesh and then the carded web defining the first layer was stacked thereon.

Figure 7:
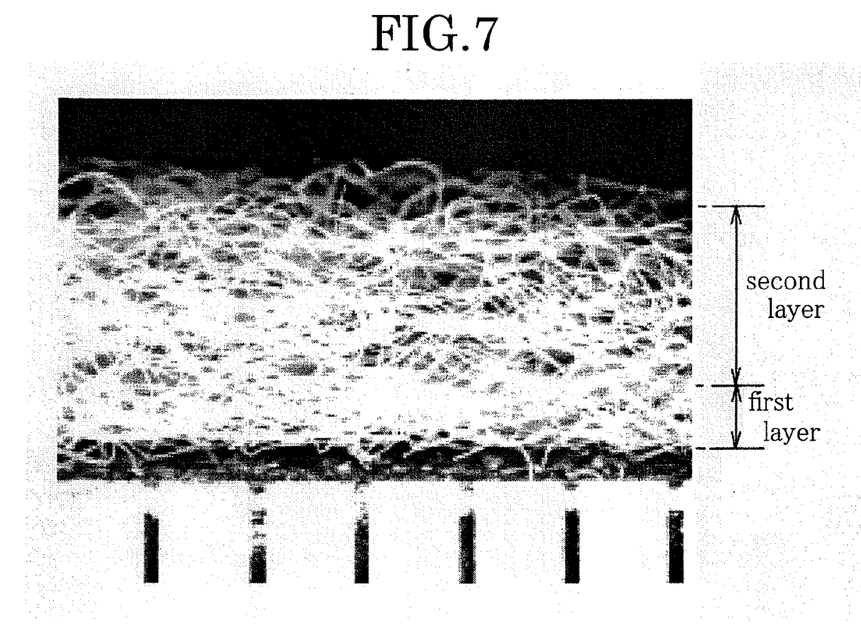
FIG. 7 is a microscopic cross-sectional photo of the surface material according to Example 6 (×90)

Hot blast at a temperature of 131° C. and an air flow of 20 Hz was exerted on the fibrous assembly from the side of the first layer for approximately 30 sec while the air-permeable net was running at a velocity of 3 m/min. Consequently, intersections of the component in the web were thermally bonded together and the surface material comprising the air-through nonwoven fabric was obtained. FIG. 7 is a microscopic cross-sectional photo of this surface material.

Comparative Example 2

The same fibers C and fibers D as used in EXAMPLE 1 were mixed together at a mass ratio of 80:20. Fibrous assembly obtained by mixing these fibers C and D was opened by the card at a rate of 20 m/min to obtain the desired carded web. This carded web had a basis weight of 35 g/m². Without exerting any substantial line tension thereon, the carded web was laid on the air-permeable net comprising 20-mesh wire mesh.

Figure 8:
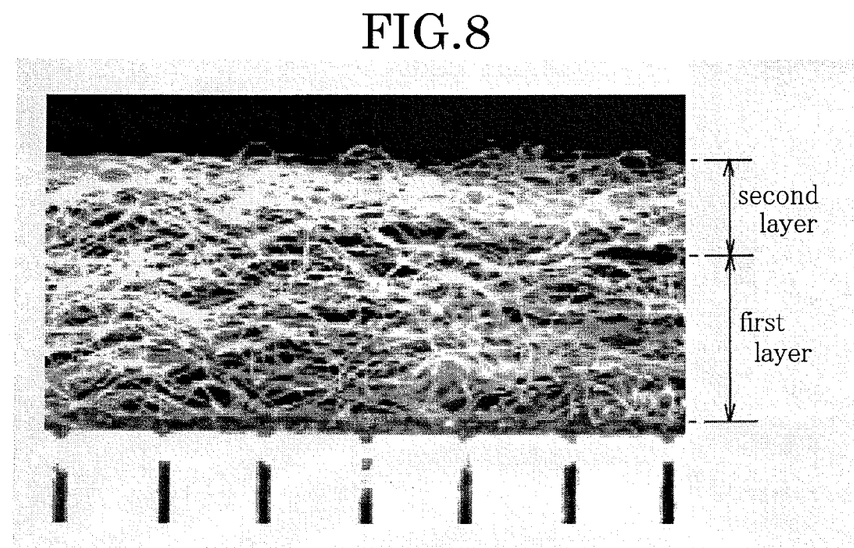
FIG. 8 is a microscopic cross-sectional photo of the surface material according to Comparative Example 2 (×90).

Hot blast at a temperature of 131° C. and an air flow of 20 Hz was exerted on the fibrous assembly from one side of the first layer for approximately 30 sec while the air-permeable net was running at a velocity of 3 m/min. Consequently, intersections of the component in the web were thermally bonded together and the surface material comprising the air-through nonwoven fabric was obtained. FIG. 8 is a microscopic cross-sectional photo of this surface material.

Constituents as well as fibers structures of fibers A through D defining the respective layers in the surface materials of EXAMPLES 5, 6 and COMPARATIVE EXAMPLE 2 are set forth in TABLE 3.

TABLE 3

| Ex. 5 | 1st layer | Fibers A: PET/PE core-sheath type; fineness of 2.2 dtex; coated with agent to modify it hydrophilic<br>Fibers B: PP/PE core-sheath type; fineness of 3.3 dtex; coated with agent to modify it hydrophilic<br>Fibers D: PET/PE core-sheath type; fineness of 2.2 dtex; coated with repellent<br>Basis weight ratio: A:B:D = 75:5:20; basis weight: 10 g/m² |
|---|---|---|
|  | 2nd layer | Fibers C: PET/PE core-sheath macaroni type; fineness of 2.6 dtex; coated with agent to modify it hydrophilic<br>Fibers D: PET/PE core-sheath type; fineness of 2.2 dtex; coated with repellent<br>Basis weight ratio: C:D = 80:20; basis weight: 25 g/m² |
| Ex. 6 | 1st layer | Fibers B: PET/PE core-sheath type; fineness of 3.3 dtex; coated with agent to modify it hydrophilic<br>Fibers D: PET/PE core-sheath type; fineness of 2.2 dtex; coated with repellent<br>Basis weight ratio: B:D = 80:20; basis weight: 10 g/m² |
|  | 2nd layer | Fibers C: PET/PE core-sheath macaroni type; fineness of 2.6 dtex; coated with agent to modify it hydrophilic<br>Fibers D: PET/PE core-sheath type; fineness of 2.2 dtex; coated with repellent<br>Basis weight ratio: C:D = 80:20; basis weight: 25 g/m² |
| Comparative ex. 2 | | Fibers C: PET/PE core-sheath macaroni type; fineness of 2.6 dtex; coated with agent to modify it hydrophilic<br>Fibers D: PET/PE core-sheath type; fineness of 2.2 dtex; coated with repellent<br>Basis weight ratio: C:D = 80:20; basis weight: 35 g/m² |

All ratios set forth in EXAMPLE 2 are mass ratios. In any of the fibers A through D, the mass ratio between the core and the sheath is core:sheath=50:50.

Basis weight, thickness and density of the surface materials respectively set forth in EXAMPLES 1 through 6 and COMPARATIVE EXAMPLES 1 and 2 are shown in TABLE 4 below.

TABLE 4

|  | Basis weight [g/m²] | Thickness [mm] | Density [g/cm³] |
|---|---|---|---|
| Example 1 | 36.2 | 0.58 | 0.062 |
| Example 2 | 36.3 | 0.62 | 0.059 |
| Example 3 | 36.1 | 0.65 | 0.056 |
| Example 4 | 35.8 | 1.06 | 0.034 |
| Comparative example 1 | 35.1 | 0.52 | 0.068 |
| Example 5 | 34.9 | 1.98 | 0.018 |
| Example 6 | 34.4 | 1.89 | 0.018 |
| Comparative example 2 | 36.7 | 1.96 | 0.019 |

As will be apparent from FIGS. 1 through 5, the second layers of the respective surface materials (FIGS. 1 through 4) according to EXAMPLES 1 through 4 are not excessively collapsed in comparison with the associated first layers. In contrast therewith, the surface material (FIG. 5) according to COMPARATIVE EXAMPLE 1 is significantly collapsed and the interfiber distance is apparently reduced.

As will be apparent from FIGS. 6 through 8, the second layers of the respective surface materials (FIGS. 6 and 7) according to EXAMPLES 5 and 6 also are not excessively collapsed in comparison with the associated first layers. In contrast therewith, the surface material (FIG. 8) according to COMPARATIVE EXAMPLE 2 is significantly collapsed and the interfiber distance is apparently reduced.

For the surface materials according to respective Examples and respective Comparative Examples, liquid residual ratio and liquid spreading were evaluated using methods as will be described below. Result of these evaluations will be shown in TABLE 5.

<Preparation of Specimen for Evaluation>

The air-through nonwoven fabric obtained by the process as has been described above was partially cut off to prepare a specimen for evaluation each dimensioned to be 100 mm in longitudinal direction×60 mm in transverse direction (machine direction during the process for making the air-through nonwoven fabric corresponds to the longitudinal direction). On the other hand, NB pulp was wrapped with tissue paper having a basis weight of 15 g/m², then partially cut off to a size of 100 mm in the longitudinal direction×60 mm in the transverse direction and compressed in the thickness direction to obtain an absorbent pad having a basis weight of 500 g/m² and a density of 0.09 g/cm³.

<Test Method>

The specimen was placed upon the absorbent pad with the second layer facing upward.

Acrylic board centrally formed with an opening dimensioned to be 40 mm in the longitudinal direction×10 mm in the transverse direction was placed upon the specimen for evaluation so that a center of the opening may fall substantially on the center of the specimen. The acrylic board was dimensioned to be 200 mm in the longitudinal direction×100 mm in the transverse direction and had a weight of 130 g.

A burette was fixed at a position so that its nozzle may be spaced 10 mm above the acrylic board and from this nozzle 3 ml of artificial menstrual blood was dropped at a dropping rate of 95 ml/min onto the specimen. Composition of the artificial menstrual blood is shown in TABLE 6 below.

One minute after dropping of artificial menstrual blood had been started, the acrylic board was removed.

Specimens (N=10) for each EXAMPLE were tested and an average value was obtained.

<Measuring Method>

Weight [g] (1) of the specimen prior to dropping of artificial menstrual blood and weight [g] (2) of the same specimen after dropping of artificial menstrual blood were measured.

Liquid residual ratio was calculated from an equation as follows:

Liquid residual ratio={(2)−(1)}/(1)×100(%)

Longitudinal dimension [mm] (3) and transverse dimension [mm](4) were measured using a ruler.

TABLE 5

| | Liquid Spreading | | | Liquid residual ratio [%] |
|---|---|---|---|---|
| | Longitudinal dimension [mm] | Transverse dimension [mm] | Area [mm²] | |
| Example 1 | 44 | 13 | 572 | 2.15 |
| Example 2 | 43 | 13 | 559 | 1.79 |
| Example 3 | 42 | 12 | 504 | 1.61 |
| Example 4 | 42 | 11 | 462 | 0.57 |
| Comparative example 1 | 49 | 19 | 931 | 3.97 |
| Example 5 | 36 | 17 | 612 | 1.36 |
| Example 6 | 34 | 16 | 544 | 1.04 |
| Comparative example 2 | 38 | 19 | 722 | 5.43 |

TABLE 6

Aqueous solution containing
Carboxymethylcellulose sodium of 0.7 wt %,
Glycerin of 7.2 wt %,
Sodium chloride of 0.9 wt %,
Sodium bicarbonate of 0.4 w %,
Edible dye compound "Food Red" of 0.9 wt %
and
Edible dye compound "Food Yellow" of 0.2 wt %
was prepared.
Viscosity of this aqueous solution was in a range of
22 to 26 mPa · s as measured using VISMETRON Model VGA 4
available from SHIBAURA SYSTEM Co., Ltd.

As will be understood from TABLE 5, the surface material according to the present invention which is provided with the first layer having a buffer function against hot blast as has been described above with respect to Examples 1 through 6 is superior to those described as Comparative Examples 1 and 2 in the aspect that any unacceptable spreading of artificial menstrual blood can be effectively prevented and liquid residual ratio can be significantly reduced.

The entire discloses of Japanese Patent Application No. 2005-203732 filed on Jul. 12, 2005 including specification, drawings and abstract are herein incorporated by reference in its entirety.

What is claimed is:

1. A surface material for an absorbent article, said surface material comprising a two-layer structure which comprises a first layer and a second layer of thermally bondable component fibers thermally bonded together when said two-layer structure is exposed to a hot blast;

wherein said surface material comprises a hot blast-exposed first surface and a second surface opposite to the first surface;

said first layer defining said hot blast-exposed first surface, which is a skin-non-contactable surface adapted to not contact a wearer's skin in use, and being adapted to function as a buffer to alleviate an influence of the hot blast upon said second surface, wherein a density of the component fibers in said first layer is higher than that of the component fibers in said second layer; and said second layer being joined to said first layer and defining said second surface, which is a skin-contactable surface adapted to contact the wearer's skin in use, wherein heat resistance of said second layer is higher than that of said first layer;

wherein the component fibers in said first layer contain fibers of a denier higher than a denier of said component fibers in said second layer.

2. The surface material defined by claim 1, wherein:

the component fibers of said first layer and said second layer comprise one or more types of thermoplastic resin; and a highest melting point of thermoplastic resin of the component fibers in said second layer is higher than a highest melting point of thermoplastic resin of the component fibers in said first layer by at least 50° C.

3. The surface material defined by claim 1, wherein:

the component fibers of said first layer comprise first and second fibers made from one or more types of thermoplastic resin;

the component fibers of said second layer comprise third and fourth fibers made from one or more types of thermoplastic resin;

a highest melting point of thermoplastic resin in said first fibers is higher than a highest melting point of thermoplastic resin in said second fibers by at least 50° C.;

a difference between a highest melting point of thermoplastic resin in said third fibers and a highest melting point of thermoplastic resin in said fourth fibers is less than 50° C.; and a content of said second fibers with respect to all fibers contained in said first layer is 5 mass % or higher.

4. The surface material defined by claim 1, wherein:

the component fibers of said first layer comprise first and second fibers made from one or more types of thermoplastic resin;

the component fibers of said second layer comprise third and fourth fibers made from one or more types of thermoplastic resin;

a highest melting point of thermoplastic resin in said first fibers is higher than a highest melting point of thermoplastic resin in said second fibers by 50° C. or more;

a highest melting point of thermoplastic resin in said third fibers is higher than a highest melting point of thermoplastic resin in said fourth fibers by at least 50° C.;

a content of said second fibers with respect to all fibers in said first layer is higher than a content of said fourth fibers with respect to all fibers in said second layer by at least 5 mass %.

5. The surface material defined by claim 3, wherein said first fibers are composite fibers made of polyolefin-based resin and polyester-based resin, said second fibers are composite fibers made of polyolefin-based resin, and said third and fourth fibers are composite fibers made of polyolefin-based resin and polyester-based resin.

6. The surface material defined by claim 4, wherein said first fibers are composite fibers made of polyolefin-based resin and polyester-based resin, said second fibers are composite fibers made of polyolefin-based resin, and said third fibers are composite fibers made of polyolefin-based resin and polyester-based resin, and said fourth fibers are composite fibers made of polyolefin-based resin.

7. The surface material defined by claim 5, wherein said first fibers are made of polyethylene and polyethyleneterephthalate, said second fibers are made of polyethylene and polypropylene, and said third and fourth fibers are made of polyethylene and polyethyleneterephthalate.

8. The surface material defined by claim 6, wherein said first fibers are made of polyethylene and polyethyleneterephthalate, said second fibers are made of polyethylene and polypropylene, said third fibers are made of polyethylene and polyethyleneterephthalate, and said fourth fibers are made of polyethylene and polypropylene.

9. The surface material defined by claim 2, wherein each of said first layer and said second layer comprises a fibrous web obtained by an air-through process.

10. The surface material defined by claim 1, wherein the component fibers are composite fibers of a core-sheath structure.

11. The surface material defined by claim 1, wherein a density of the component fibers in said first layer is 0.03 to 0.20 g/cm$^3$ and a density of the component fibers in said second layer is 0.01 to 0.15 g/cm$^3$.

12. The surface material defined by claim 1, wherein an interfiber distance of the component fibers in said first layer is in a range of 5 to 200 μm.

13. A surface material for an absorbent article, said surface material comprising a two-layer structure which comprises first and second layers joined together when said two-layer structure is exposed to a hot blast, said first layer comprising a microporous thermoplastic film having porosity in a range of 5 to 40% and defining a hot blast-exposed first surface adapted to function as a buffer to alleviate an influence of the hot blast upon a second surface opposite to said hot blast-exposed surface, and said second layer comprising thermally bondable component fibers, which are thermally bonded together when the two-layer structure is exposed to the hot blast, and defining said second surface;

wherein a diameter of each micropore of said microporous thermoplastic film is in a range of 0.2 to 5.0 mm and an area of each micropore is in a range of 0.03 to 30 mm$^2$.

14. The surface material defined by claim 13, wherein a material for said microporous thermoplastic film is selected from polyethylene, polypropylene, polyethyleneterephthalate, polyvinyl alcohol, polylactic acid and polybutyl succinate.

15. The surface material defined by claim 13, wherein said second layer comprises one or more types of thermoplastic resin fibers.

16. The surface material defined by claim 13, wherein the component fibers of said second layer are composite fibers of a core-sheath structure.

17. The surface material defined by claim 13, wherein the microporous thermoplastic film is hydrophilic.

* * * * *